(12) United States Patent  (10) Patent No.: US 7,070,027 B2
Manecke et al.  (45) Date of Patent: Jul. 4, 2006

(54) MAGNETO-RHEOLOGICAL DAMPER

(75) Inventors: Peter Manecke, Frammersbach (DE); Bernd Winkler, St Florian (AT); Bernhard Manhartsgruber, Peterskirchen (AT)

(73) Assignee: Bosch Rexroth AG, Stuttgart (DE)

( * ) Notice: Subject to any disclaimer, the term of this patent is extended or adjusted under 35 U.S.C. 154(b) by 0 days.

(21) Appl. No.: 10/488,988

(22) PCT Filed: Aug. 21, 2002

(86) PCT No.: PCT/DE02/03062

§ 371 (c)(1),
(2), (4) Date: Aug. 13, 2004

(87) PCT Pub. No.: WO03/025418

PCT Pub. Date: Mar. 27, 2003

(65) Prior Publication Data

US 2004/0262106 A1  Dec. 30, 2004

(30) Foreign Application Priority Data

Sep. 7, 2001 (DE) .............................. 101 43 980

(51) Int. Cl.
*F16F 9/53* (2006.01)

(52) U.S. Cl. ............... 188/267.2; 188/312; 188/267; 267/140.14

(58) Field of Classification Search .......... 267/140.13, 267/140.14; 188/267, 267.1, 267.2, 322.22, 188/322.19, 312; 192/21.5; 60/326; 91/459; 137/909, 807
See application file for complete search history.

(56) References Cited

U.S. PATENT DOCUMENTS

| 2,940,749 | A |   | 6/1960 | Kemelhor ................. 267/1 |
| 3,628,638 | A | * | 12/1971 | Curchack ................. 188/312 |
| 5,000,299 | A | * | 3/1991 | Goto et al. ................. 188/267.1 |
| 5,241,991 | A |   | 9/1993 | Iorio et al. ................. 137/807 |
| 5,398,917 | A |   | 3/1995 | Carlson et al. ......... 267/140.14 |
| 5,449,150 | A | * | 9/1995 | Watanabe et al. ......... 267/64.24 |
| 5,452,745 | A |   | 9/1995 | Kordonsky et al. ......... 137/807 |
| 5,492,312 | A |   | 2/1996 | Carlson ................. 267/140.14 |
| 5,848,678 | A | * | 12/1998 | Johnston et al. ........... 192/21.5 |
| 5,984,385 | A |   | 11/1999 | Shtarkman et al. ...... 292/251.5 |
| 6,095,486 | A |   | 8/2000 | Ivers et al. ............. 251/129.01 |
| 6,463,736 | B1 | * | 10/2002 | Pohl et al. ................. 60/326 |
| 2004/0262106 | A1 | * | 12/2004 | Manecke et al. ......... 188/267.2 |

FOREIGN PATENT DOCUMENTS

| DE | 1177444 | * | 9/1964 |
| DE | 197 17 693 A1 |   | 10/1998 |
| DE | 010143980 A1 | * | 3/2003 |
| EP | 0 335 016 |   | 10/1989 |
| FR | 2 579 283 |   | 3/1985 |
| GB | 1 282 568 |   | 7/1972 |
| WO | WO 01/16503 A1 |   | 3/2001 |

* cited by examiner

*Primary Examiner*—James McClellan
*Assistant Examiner*—Bradley T. King
(74) *Attorney, Agent, or Firm*—Boyle Fredrickson Newholm Stein & Gratz S.C.

(57) ABSTRACT

A magneto-rheological (MR) damper including a piston guided in a cylinder that is filled with a magneto-rheological fluid, its work volume being formed oblique relative to the piston axis between the piston and the cylinder.

13 Claims, 2 Drawing Sheets

MAGNETO-RHEOLOGICAL DAMPER

BACKGROUND OF THE INVENTION

1. Field of the Invention

The invention concerns a magneto-rheological (MR) damper, and more particularly, an MR damper that is readily adaptable to the conditions of the damping properties.

2. Description of the Related Art

MR dampers include a magneto-rheological fluid, a work volume to which the fluid is applied, and an element for generating a magnetic field, wherein the yield limit of the fluid may be modified by application of the magnetic field.

A housing cavity is divided by a piston into a piston-swept volume and a cylinder volume, with the fluid being capable of flowing between the volumes through openings. In principle, MR dampers operating in the Valve Mode, Shear Mode, or Squeeze Mode are known. Frequently the single principles are mixed, however, so that an accurate classification is not possible.

A MR damper operating, e.g., in the valve and shear modes is disclosed in patent specification U.S. Pat. No. 5,398,917 FIG. 3. The openings are formed between the moving piston and the housing inner wall. The fluid in the gap is subjected to the magnetic filed by an electrical coil radially arranged on the piston. In the event of axial movements of the piston, the fluid flows through the openings from the cylinder volume into the piston-swept volume or vice versa. Owing to the ratio of free cross-section/cylinder (piston-swept) volume <1, the movement of the piston is damped correspondingly. The opening acts as a valve, the effect of which may be increased or reduced by a change in viscosity.

Moreover the fluid flowing through the openings is sheared across the free cross-section on the stationary housing inner wall and the moving piston, resulting in additional damping.

It is a drawback in this solution that the coil is mounted on the piston, so that an adaptation of the MR damper to the conditions of the respective task (damping properties) by simple and rapid replacement of the coil is not possible. Optimum adaptation of the MR damper to different damping conditions accordingly is not possible.

It is another drawback of the known solution that damping takes place not so much through the viscosity of the fluid than rather the cross-section of the openings in the piston and the related throttling effect. In other words, the flow and creep properties of the magneto-rheological fluid are not put to optimum use.

It is another drawback of this solution that when a load is applied, the valve mode may possibly create a considerable pressure differential between the cylinder-swept volume and the cylinder volume, with all the components of the MR damper, in particular seals, having to be designed with corresponding adaptations.

An MR damper in which the coil is arranged externally of the housing cavity and which does not operate in the valve mode, is disclosed in U.S. Pat. No. 5,492,312. The MR damper operates in the squeeze mode, so that by application of a magnetic field by means of the coil, which extends through the full length of the MR damper, the entire housing cavity and thus the entire fluid is subjected to the magnetic field. Here the fluid may flow through an annular space between the piston and the housing inner wall between the cylinder volume and the piston-swept volume.

It is a drawback of this solution that the entire housing cavity is exposed to the magnetic field, with damping accordingly being achieved not so much by squeezing the fluid in the piston-swept volume or through the annular space, but rather by pinching of the piston in the fluid.

SUMMARY OF THE PRESENT INVENTION

It is an object of the present invention to furnish an MR damper which eliminates the named drawbacks and thus exhibits substantially improved response characteristics.

This object is attained with a magneto-rheological (MR) damper including a piston guided in a damper cavity of a cylinder that is filled with a magneto-rheological fluid, the rheological properties of which may be modified by application of a magnetic field, wherein concurrently with a movement of the piston, the fluid is pushed from a work volume into a reception space, and wherein the work volume is formed by an annular space extending obliquely relative to the piston axis between the piston and the cylinder.

In order to attain this object, an MR damper is furnished which preferably operates in the squeeze mode and in the shear mode. The valve mode is distinctly reduced. The single axial openings between a cylinder and a piston are in accordance with the invention replaced by an annular space formed obliquely relative to the piston axis. Here a displacement volume in continuation of the annular space and a piston cavity connected with the annular space through bores constitute the cylinder volume (piston cavity) and the piston-swept volume (displacement volume). The valve effect is reduced through a correspondingly selected diameter of the bores relative to the inner width of the annular space. For generating a magnetic field in the annular space, an electrical coil is affixed radially outside the cylinder.

The essential advantage of the preferred arrangement of the electrical coils externally of the housing cavity resides in the fact that the electrical coils may be replaced rapidly and easily, so that a corresponding adaptation of the MR damper to the conditions of use may be realized.

Once the piston is moved in an axial direction, the fluid opposes to the piston force a squeeze force and a shear force, whereby the piston is damped accordingly. The squeeze and shear forces i.a. depend on the viscosity, the diameter of the bores, and the oblique orientation of the annular space relative to the piston axis.

A preferred embodiment provides to form the MR damper symmetrically relative to a transverse axis, so that damping may take place both in the pulling and pushing directions. The piston cavity communicates through additional bores with a second annular space which opens into a second displacement volume. The second annular space is also pervaded by a magnetic field from an electrical coil, with the coils optionally generating opposite-sense or same-sense magnetic fields.

In this case the piston cavity merely is to be considered a through passage for the fluid into the second displacement volume. In accordance with the axial direction of movement of the piston, either the first displacement volume or the second displacement volume thus operates as a cylinder-swept volume or a cylinder volume.

In another preferred embodiment, the MR damper is provided with filling and bleeding bores. Moreover the bores between the annular spaces and the piston cavity are positioned closer to the piston axis, whereby the squeeze mode is emphasized more strongly.

A particular field of application of the MR damper in accordance with the invention is damping of high frequencies as occur, e.g., in railway facilitites. When correspondingly installed in the track bedding or in the foundation, it is in particular possible to suppress high frequencies.

Further advantageous embodiments are subject matters of the subclaims.

BRIEF DESCRIPTION OF THE DRAWINGS

Preferred embodiments are explained in more detail in the following schematic representations, wherein.

DETAILED DESCRIPTION OF THE PREFERRED EMBODIMENTS

Figure 1:
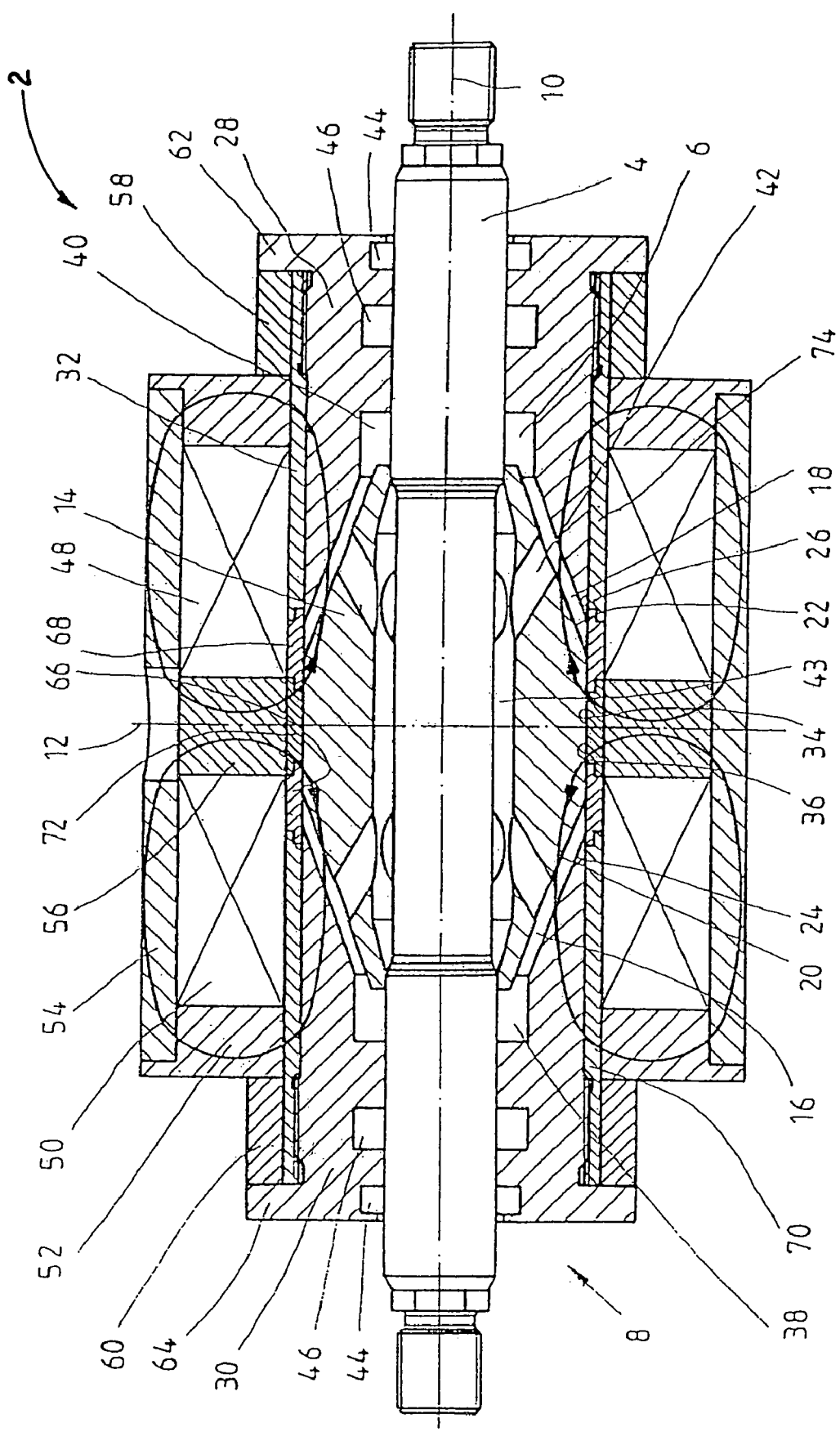
FIG. 1 is a sectional view of a magneto-rheological damper in accordance with the invention.

FIG. 1 shows a magneto-rheological (MR) damper 2 in accordance with the invention which includes a piston 4 on a magnetically non-conductive piston rod 5 (see FIG. 2), which is guided in a damper cavity 6 of a cylinder 8 filled with a magneto-rheological fluid. The MR damper 2 is of a symmetrical design relative to a transverse axis 12 extending transversely to the longitudinal axis 10, whereby a damping stroke in both axial directions of movement is achieved, so that tensile and compressive forces may be damped.

The piston 4, also referred to as an armature, forms between its inner cone surfaces 20, 22 of the cylinder 8 and its correspondingly shaped outer cone surfaces 24, 26 two annular spaces 16, 18 extending obliquely to the piston axis 10. Owing to the oblique orientation of the annular spaces 16, 18 the annular space volume is increased in contrast with axially oriented annular spaces, so that correspondingly more fluid is available for damping of the piston 4. The inner cone surfaces 20, 22 of the cylinder 8 are formed by two piston counterparts 28, 30 in axially opposite positions, also referred to as armature counterparts. The piston counterparts 28, 30 are inserted in a pole tube 32 and spaced apart so that in a range between them on the inner peripheral surfaces 34 of the cylinder 8 a guide surface 36 for the piston 4 in the cylinder 8 is formed. Between guide surface 36 and piston 4 there is a fluid film. This latter is strained in the shear mode and thus assumes the task of the shear mode, i.e., upon application of a magnetic field the shearing strain (viscosity) of the medium (MR fluid) is increased. As a result of the increased shearing strain, movement of the piston (armature) is opposed by an increased kinetic resistance. It is to be noted that—although the fluid film is formed by the magneto-rheological fluid, fluid does not flow along the guide surface 36 between the annular spaces 16, 18.

The annular spaces 16, 18 extend between the inner cone surfaces 20, 22 and the outer cone surfaces 24, 26 radially between internal displacement volumes 38, 40 and the external inner peripheral surface 34 of the pole tube 32. In the center portion of the annular spaces 16, 18, bores 42 are formed in the piston 4 which are in communication with a piston cavity 43, so that the fluid may flow between the displacement volumes 38, 40 in accordance with the axial movement of the piston 4. Flow of the fluid through the piston cavity 43 allows to guide the piston 4 in accordance with MR dampers in the valve mode, wherein other than with known MR dampers in accordance with the squeeze and shear modes, the slide surface is not provided with through passages. The displacement volumes 16, 18 are separated from the environment by seals 44, 46, e.g. membrane seals radially arranged around the piston axis in the piston counterparts 28, 30,.

Radially outside of the damper cavity 6 two electrical coils 48, 50 are arranged side by side around the cylinder 8. The electrical coils 48, 50 encompass the pole tube 32 and are each sheathed by magnetically conductive segments 52, 54, 56. Axial securing of the electrical coils 48, 50 is achieved through spacer rings 58, 60 between flange-type end portions 62, 64 of the piston counterparts 28, 30. The electrical coils 48, 50 may be driven independently and in particular extend through the annular spaces 38, 40 with one magnetic field each, with the magnetic fields preferably being opposite to each other. This has the advantage that the piston 4 in the cylinder 8 automatically returns into a start position after damping when both coils 48, 50 are driven, so that an external device for resetting the piston, such as a spring, is not necessary. It is an additional advantage of this arrangement that the MR damper of the invention may be utilized as a differential throttle path measurement device, so that the damping stroke can be measured in parallel with damping.

In order to avoid superpositions of the two magnetic fields, two magnetically non-conductive rings 66, 68 divide the pole tube 32 into three magnetically conductive segments 70, 72, 74. The number of magnetically non-conductive rings 66, 68 depends on the number of electrical coils 48, 54.

In the event of axial movements of the piston 4, the fluid both in the displacement volume 38, 40 and in the annular space 16, 18 is squeezed, with shear taking place in the opening range of the bores 42. Damping essentially takes place as a result of squeeze in the annular space 38, 40 above the bores 42, for the magnetic field is primarily applied to annular space 38, 40, and the fluid may flow from the displacement volume 16, 18 via the annular space 38, 40 into the bores 42 and thus into the piston cavity 43 or the opposite displacement volume 16, 18, respectively.

In order to support the shear effect, the diameters of the bores 42 are selected such as to be greater than the inner width of the annular spaces 38, 40. Accordingly the bores 42 practically do not constitute a throttling location for the fluid flow, so that a differential pressure does not build up between the openings of the bores 42.

The effect of the valve mode accordingly is of secondary importance. Although it may be intensified by reducing the diameters of the bores 42 relative to the inner width of the annular spaces 38, 40, this measure nevertheless results in a reduction of the shear and squeeze effects.

A damper stroke may in principle be determined through the design of the MR damper and the viscosity of the fluid (yield limit in proportion to the applied magnetic field). It is, for example, possible to modify the structure of the MR damper to the effect of changing the ratio diameter of bores 42/inner width of the annular spaces 16, 18 in order to intensify the valve mode, or to choose a modified oblique orientation of the annular spaces relative to the piston axis in order to further emphasize the shear and squeeze modes. The yield limit may be raised, for example, by extending the magnetic field to the displacement volume 38, 40.

Figure 2:
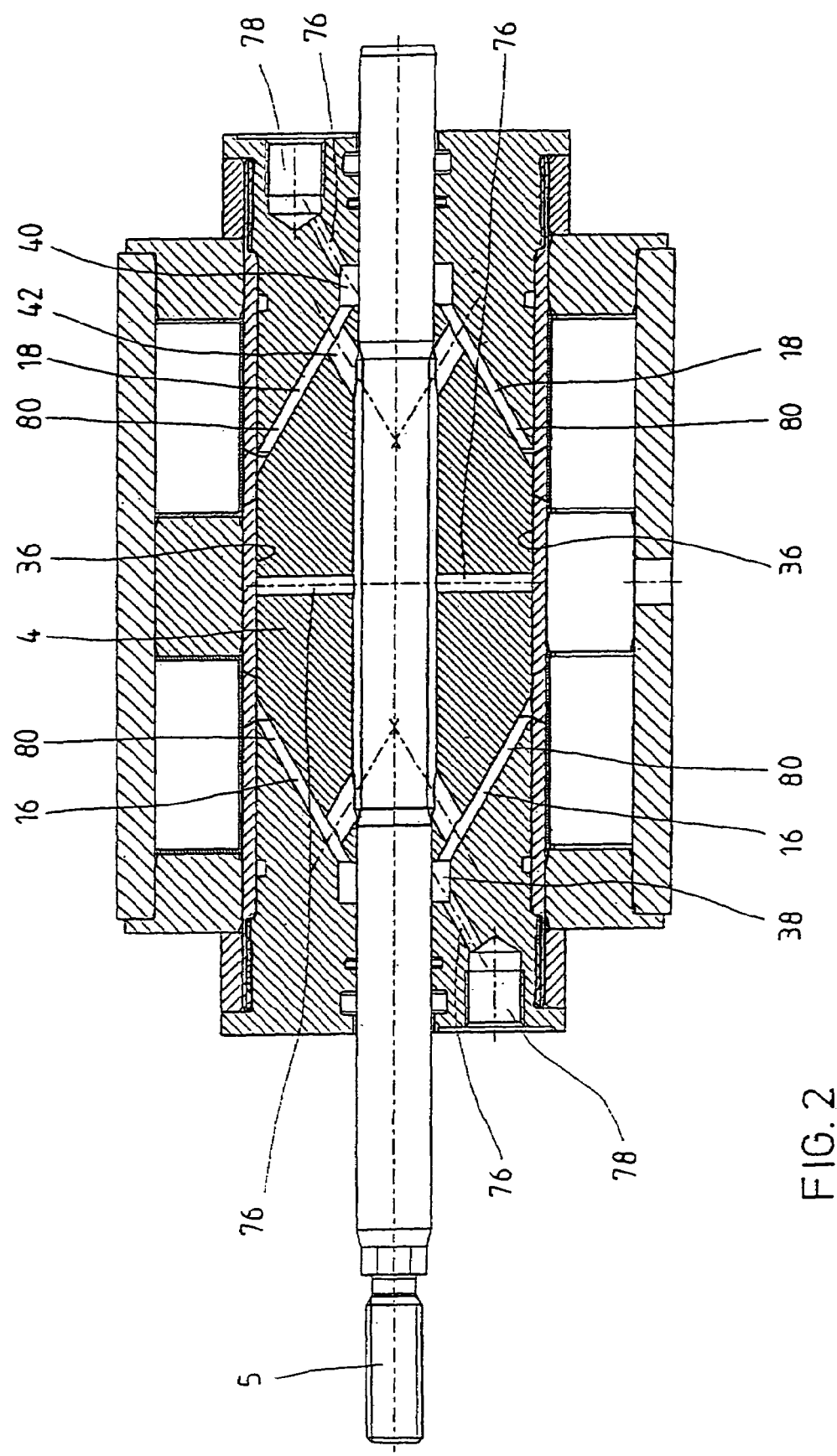
FIG. 2 is a sectional view of a magneto-rheological damper in accordance with the invention having filling and bleeding bores.

FIG. 2 shows an MR damper with filling and bleeding bores 76. The filling and bleeding bores 76 extend on the one hand in the piston counterparts 28, 30 approximately axially between the displacement volumes 38, 40 and axially extending recesses 78 in the flange-type end portions 62, 64, and on the other hand radially through the piston 4 from the piston cavity 43 in a direction towards the guide surface 36. The recesses 78 are designed as filling openings and may be opened or closed with the aid of a corresponding closure, preferably screw plug.

Due to the arrangement of the filling and bleeding bores 76, trapping of air cannot occur when the filling openings are opened simultaneously during filling, and residual amounts of old fluid cannot gather in the MR damper 2 when the fluid is exchanged.

In addition, the bores 42 in the piston 4 are arranged closer to the piston rod 5. This has the advantage that the range 80 of the annular spaces 16, 18 located above the bores 42 is prolonged, whereby the squeeze effect is intensified.

One embodiment provides for the electrical coils 48, 50 to be arranged not externally of, but inside the damper cavity 6, e.g. radially on the piston 4.

Another embodiment provides to generate required magnetic fields not through electrical coils 48, 50 but through other suitable elements such as, for instance, magnets. The number of elements here depends on the damper force to be applied. It is conceivable for not only a annular space 18, but other ranges of the damper cavitys 6 or the entire damper cavity 6 being subjected to magnetic fields.

Another embodiment provides for the fluid not to flow through a piston cavity 43 between a cylinder-swept volume and cylinder volume, but an internal space being formed between the piston 4 and an inner peripheral surface 34.

What is disclosed is a magneto-rheological (MR) damper including a piston guided in a cylinder that is filled with a magneto-rheological fluid, its work volume being formed oblique relative to the piston axis between the piston and the cylinder.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept. The scope of still other changes to the described embodiments that fall within the present invention but that are not specifically discussed above will become apparent from the appended claims.

The invention claimed is:

1. A magneto-rheological (MR) damper including a piston guided in a damper cavity of a cylinder that is filled with a magneto-rheological fluid, the rheological properties of which may be modified by application of a magnetic field; and
   wherein concurrently with a movement of the piston the fluid is pushed from a first work volume into a second work volume, and wherein each work volume is formed by an annular space extending obliquely relative to the piston axis between an outer cone surface of the piston and an inner cone surface of the cylinder, wherein by a movement of the piston the fluid flows from one annular space to the other annular space through a piston cavity which communicates with each annular space through at least one bore.

2. A MR damper in accordance with claim 1, wherein the piston rod forms the piston cavity.

3. A MR damper in accordance with claim 1, wherein the bore is arranged in substantially a center of one of the annular spaces in the piston, a bore diameter being selected such that the inner width of the one annular space is substantially smaller than the bore diameter.

4. A MR damper in accordance with claim 1, wherein each inner cone surface is formed by a piston counterpart inserted into a pole tube, the inner peripheral surface of which defines at least one of the annular spaces in a range between the piston counterparts placed at a distance from each other.

5. A MR damper in accordance with claim 1, wherein in continuation of the annular spaces displacement volumes are formed.

6. A MR damper in accordance with claim 1, wherein the MR damper is symmetrical relative to a transverse axis extending transversely to a longitudinal axis of the cylinder.

7. A MR damper in accordance with claim 1, wherein the damper cavity is axially separated from the environment by seals.

8. A MR damper in accordance with claim 4, wherein the pole tube is divided by two magnetically non-conductive rings into three magnetically conductive segments.

9. MR damper in accordance with claim 1, further comprising elements for generating a magnetic field in the annular spaces.

10. A MR damper in accordance with claim 9, wherein the elements are two electrical coils for generating magnetic fields, the coils being applied externally of the annular spaces.

11. A MR damper in accordance with claim 5, wherein the MR damper includes filling and bleeding bores, with some filling and bleeding bores opening into filling openings adapted to be opened and closed with the aid of a screw plug.

12. A MR damper in accordance with claim 11, wherein the filling and bleeding bores extend approximately axially through piston counterparts from the filling openings to the displacement volumes, and radially through the piston from the piston cavity in the direction of a guide surface.

13. A MR damper in accordance with claim 7, wherein the seals are membrane seals.

\* \* \* \* \*